United States Patent
Bauer et al.

(10) Patent No.: US 9,133,754 B2
(45) Date of Patent: Sep. 15, 2015

(54) MUFFLER INSERT FOR MOTOR VEHICLES AND METHOD FOR PRODUCING SAME

(75) Inventors: Thomas Bauer, Homburg (DE); Karl-Christian Regent, Wolfenbuettel (DE); Martin Schwerdtfeger, Einbeck (DE)

(73) Assignee: DBW Holding GmbH, Bovenden (DE)

( * ) Notice: Subject to any disclaimer, the term of this patent is extended or adjusted under 35 U.S.C. 154(b) by 0 days.

(21) Appl. No.: 14/001,186

(22) PCT Filed: Feb. 23, 2012

(86) PCT No.: PCT/EP2012/053071
§ 371 (c)(1),
(2), (4) Date: Oct. 31, 2013

(87) PCT Pub. No.: WO2012/113866
PCT Pub. Date: Aug. 30, 2012

(65) Prior Publication Data
US 2014/0054106 A1    Feb. 27, 2014

(30) Foreign Application Priority Data
Feb. 23, 2011   (DE) .......................... 10 2011 012 156

(51) Int. Cl.
*F01N 1/24*     (2006.01)
*D04H 3/07*     (2012.01)
(Continued)

(52) U.S. Cl.
CPC .............. *F01N 13/08* (2013.01); *B29C 53/564* (2013.01); *B29C 65/562* (2013.01);
(Continued)

(58) Field of Classification Search
USPC ........ 181/294, 252, 256; 29/890.08, 890.053; 156/194, 184; 162/358.1, 358.2
See application file for complete search history.

(56) References Cited

U.S. PATENT DOCUMENTS 3,294,887 A * 12/1966 Altermatt .................... 264/229
4,234,054 A * 11/1980 Chapin ........................ 181/252
(Continued)

FOREIGN PATENT DOCUMENTS

AT      256458 B     8/1967
DE      2003960 A1   12/1970
(Continued)

OTHER PUBLICATIONS

Wikipedia: Roving. Version vom Jul. 15, 2012. [recherchiert am Sep. 7, 2011]. Im Internet: <URL: http://de.wikipedia.org/w/index.php?title=Roving&oldid=76699582>.
(Continued)

*Primary Examiner* — Edgardo San Martin
(74) *Attorney, Agent, or Firm* — Whitham Curtis Christofferson & Cook, PC

(57) ABSTRACT

A first aspect of the present application relates to a method for producing sound-damping, sound-absorbing and/or insulating molded material. More specifically, the method according to the invention relates to a method for producing said molded materials, wherein the fibrous material is wound around at least two carriers and subsequently the wound blank thus obtained remains on the carriers so as to be permanently solidified in order to obtain the molded material according to the invention. A further aspect of the present application concerns the molded material thus obtained, in particular in the form of molded mats or molded objects. Said molded material can be used, in particular, in mufflers. Finally, the following application concerns a device for producing said molded materials from fibrous material.

18 Claims, 4 Drawing Sheets

(51) Int. Cl.
*F01N 13/08* (2010.01)
*B29C 53/56* (2006.01)
*D04H 1/4382* (2012.01)
*D04H 5/08* (2012.01)
*B29C 65/56* (2006.01)
*B32B 37/14* (2006.01)
*F01N 1/00* (2006.01)
*D04H 3/00* (2012.01)

(52) U.S. Cl.
CPC .......... *B32B 37/142* (2013.01); *D04H 1/4382* (2013.01); *D04H 5/08* (2013.01); *F01N 1/24* (2013.01); *F01N 2310/02* (2013.01); *Y10T 442/25* (2015.04)

(56) References Cited

U.S. PATENT DOCUMENTS

| | | | | |
|---|---|---|---|---|
| 4,296,597 | A * | 10/1981 | Tani et al. | 57/205 |
| 5,100,047 | A * | 3/1992 | Nakagawa et al. | 228/176 |
| 5,341,632 | A * | 8/1994 | Jung et al. | 57/208 |
| 5,360,656 | A * | 11/1994 | Rexfelt et al. | 428/193 |
| 5,461,777 | A * | 10/1995 | Ikeda et al. | 29/890.08 |
| 5,670,756 | A * | 9/1997 | Ohtaka et al. | 181/256 |
| 5,718,045 | A * | 2/1998 | Tsukahara et al. | 29/890.08 |
| 6,148,955 | A * | 11/2000 | Wolf et al. | 181/252 |
| 6,162,518 | A * | 12/2000 | Korfer | 428/60 |
| 6,196,351 | B1 * | 3/2001 | Clokey et al. | 181/252 |
| 8,501,643 | B2 * | 8/2013 | Kamiya et al. | 442/332 |
| 8,505,203 | B2 * | 8/2013 | Freis et al. | 29/890 |
| 2002/0139503 | A1 | 10/2002 | Davenport | |

FOREIGN PATENT DOCUMENTS

| | | | |
|---|---|---|---|
| DE | 2530508 C3 | 10/1979 | |
| DE | 69105559 T2 | 4/1995 | |
| DE | 202008005112 U1 | 5/2009 | |
| DE | 10 2011 000105 A1 | 8/2011 | |
| EP | 0 125 835 A2 | 11/1984 | |
| EP | 0125835 A2 | 11/1984 | |
| EP | 1217184 A1 * | 6/2002 | F01N 1/24 |
| JP | 07019021 | 1/1995 | |
| JP | 11324641 | 11/1999 | |
| WO | 9713634 A1 | 4/1997 | |
| WO | 00/11327 A1 | 3/2000 | |
| WO | 2005/005796 A1 | 1/2005 | |

OTHER PUBLICATIONS

Wikipedia: Garn. Version vom Feb. 20, 2011. [recherchiert am Sep. 7, 2011]. Im Internet: <URL: http://de.wikipedia.org/w/index.php?title=Garn&oldid=85520687>.

Wikipedia: Zwirn. Version vom Dec. 21, 2010. [recherchiert am Sep. 7, 2011]. Im Internet: <URL: http://de.wikipedia.org/w/index.php?title=Zwirn&oldid=82928839>.

Coil Winding International. Berlin CWIEME Show Catalogue Edition, vol. 34, Issue 3, 2010, Seite 46/47.

Wikipedia: Monofilament. Version vom Aug. 7, 2010. [recherchiert am Sep. 7, 2011]. Im Internet: <URL: http://de.wikipedia.org/w/index.php?title=Monofilament&oldid=77547167>.

* cited by examiner

MUFFLER INSERT FOR MOTOR VEHICLES AND METHOD FOR PRODUCING SAME

FIELD OF THE INVENTION

A first aspect of the present application relates to a method for producing sound-damping, sound-absorbing and/or insulating molded material. More specifically, the method according to the invention relates to a method for producing said molded materials, wherein the fibrous material is wound around at least two carriers and subsequently the wound blank thus obtained presented on the carriers is permanently solidified in order to obtain the molded material according to the invention. A further aspect of the present application concerns the molded material thus obtained, in particular in the form of molded mats or molded objects. Said molded material can be used, in particular, in mufflers. Finally, the following application concerns a device for producing said molded materials from fibrous material.

PRIOR ART

Mufflers have sound-damping or sound-absorbing and insulating materials. Usually, glass-fiber materials are the fiber materials used for this purpose. These fibrous materials can be injected as loose fibers into the intermediate regions of assembled mufflers. Corresponding methods are described, e.g., in DE 10 2005 009 045 or EP 953 736. Disadvantages of such injection methods lie in the non-optimal distribution of the fibrous material, in particular in regions such as angles or other undercuts which are difficult to inject into, and also in the practical implementation of the injection method for certain non-cylindrical muffler contours, but also for what are referred to as semi-shell mufflers.

Another method for the manufacturing of corresponding mufflers containing fibrous material comprises the introduction of sound-absorbing or sound-insulating fibrous materials during the assembly of the muffler. The fibrous materials are introduced into the muffler prior to the closing of the muffler. The introduction here may follow via various methods. In this manner, presently fibrous material, in particular glass-fiber material in bags, i.e. in plastic bags, is inserted into the mufflers during assembly. Here, these plastic bags, which can also be provided in the form of nets, are formed from a polymer or a polymer matrix which melts at comparatively high temperatures. During the initial operation of the muffler, with the corresponding heating of the muffler, this polymer melts and releases the loose glass-fiber material. A great disadvantage here, however, is that an unpleasant odor arises on account of the melting or carbonizing of the polymer material and the environment is impacted.

A further disadvantage of using loose glass fibers filled into bags is that complex structures in mufflers cannot be adequately filled by the fibers. Moreover, a blow-out of loose glass fibers may occur.

In an alternative method, mats made of glass-fiber materials are inserted into the muffler as inserts. The muffler is subsequently closed. These inserts may be densified by melt threads. These melt threads here are configured such that they melt when the muffler is heated for the first time and in this manner the insert can spread out completely in the vacant spaces of the muffler.

EP 1 861 592 describes a method for filling mufflers of internal combustion engines with sound-damping material. The material here is molded from glass fibers and comprises a winding of the glass-fiber threads around a tube or a roll winder in order to obtain a tubular mass of glass fibers. The mass here is configured such that it corresponds in its dimensions to the space which has to be filled in the muffler. After winding, the tubular mass is removed from the tube or the roll winder and subsequently, in a second step, is densified in a further device, such that a flattened tubular mass is presented. This flattened mass is then solidified by irreversibly interwoven or unified glass fibers and concatenations formed therefrom. Subsequently, the muffler is closed. Corresponding muffler materials made of wound glass fiber are known from U.S. Pat. No. 6,196,351.

SUMMARY

An objective of new molded materials, such as molded mats or molded objects as semi-finished products for mufflers, is the necessity to reduce the amount of material used in order to promote lightweight construction and thus to reduce fuel consumption. Furthermore, it should be possible for the densities within the material of the semi-finished product to be configured in a variable manner and for the semi-finished product itself to be easily introduced into the muffler. An application-specific shaping is preferably possible here, in particular the production of molded objects with cavities. Production should be improved in terms of ecology and in particular no harmful substances, or only a very low level thereof, should be emitted during usage, as is described in the context of the use of bags. Furthermore, the method should simplify the production of corresponding molded materials, and the molded materials obtained should demonstrate improved properties also during operation.

The invention is based on the object of providing a method having the features of the preamble of patent claim 1, molded material thus obtainable, in particular for mufflers, and also a device having the features of the preamble of patent claim 12, and corresponding mufflers.

In particular, the invention is also intended to allow a uniform filling of the attenuation chamber in the case of complicated geometrical shapes of the attenuation chamber in a muffler, the material investment and also the emissions and environmental impact being kept as low as possible. The molded material used here should also have a high dimensional stability during operation, and any displacement of the fibers in the molded material relative to one another should be minimized in order to preserve the thermal and acoustic properties of the material.

DESCRIPTION OF THE INVENTION

Figure 1A:
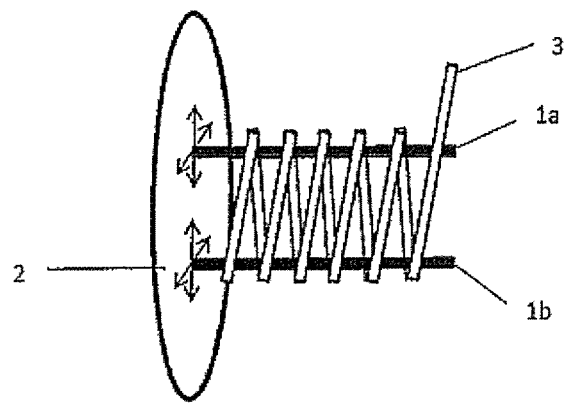
FIGS. 1A-1C show examples winding fibrous materials on carriers.

According to the method according to the invention for the manufacturing of sound-damping, sound-absorbing and/or insulating molded material, said molded material comprising fibrous material, in a first step the fibrous material is wound around at least two carriers which are spaced apart from one another, for the manufacturing of a wound blank. In a second step, the wound blank thus obtained, which is still situated on the carriers, is permanently solidified in order to obtain a sound-damping, sound-absorbing and/or insulating molded material.

It is preferable here for the solidification to take place in such a manner that the molded material itself remains flexible. In particular, it is therefore preferable for the molded material to contain no bonding agent for solidification.

The at least two carriers here are configured such that they are preferably displaceable, to allow the production of wound blanks of various dimensions. In a preferred embodiment, the fibrous material is wound around at least three carriers to produce molded material in the form of objects, in particular hollow objects. Said at least three carriers, which are spaced apart from one another, are preferably displaceable, to allow a diverse dimensioning of the molded material obtained.

The carriers here may be configured as bars or tubes. Alternatively, the carriers may also represent sheet-metal parts or differently dimensioned carriers. The carriers here may have a discontinuous diameter. Furthermore, the carriers may be present in a rectilineal or curved manner in order to impart a predetermined shape to the molded material. The carriers, such as corresponding bars, here may be correspondingly curved and discontinuously dimensioned in their diameter such that a correspondingly desired structure and shape is imparted to the wound blank. In the subsequent solidification of the wound blank the structure and/or shape are correspondingly retained, since the wound blank remains on the shape-imparting carriers during solidification. It is correspondingly easy to impart a permanent shape to the wound blank in the form of a molded mat or a molded object, in particular also in the form of a hollow object. This permanent shape, however, is preferably still configured to be flexible.

This means that even complex geometrical shapes of the attenuation chamber in the muffler can be filled by the molded material. It is correspondingly possible to produce semi-finished products or components in which the amount of fibrous material used is reduced, in order to allow a lightweight construction in this manner. Said lightweight construction has the consequence that ecological advantages, such as a reduction of fuel consumption etc., are achieved. Furthermore, the molded material obtained is distinguished by outstanding dimensional stability. Furthermore, the fibers in the molded material, on account of the solidification, have a good stability in relation to one another. This means that a displacement of the fibrous material during operation as a result of vibrations or shocks, and thus a change in the acoustic and dampening properties, is minimized.

On account of the displaceable configuration of the carriers, the molded part can be configured in a variable manner. It is furthermore possible to influence the properties of the molded material by a corresponding selection of fibrous materials.

The carriers may be configured using a variety of materials and have a variety of surfaces. In this manner, the carriers can be finished to be slip-resistant.

The method according to the invention further allows molded parts having different densities to be provided. On account of the permanent solidification in predetermined regions it is possible to achieve different densities in the molded material in said regions. On account of the configuration of the solidification regions it is correspondingly possible to configure the density of the molded material in a variable manner. Furthermore, the dimensional stability, but also the reduction in the displacement of the fibers in relation to one another, is improved.

By a corresponding configuration of the solidification it is furthermore possible to provide molded material, in particular molded mats and molded objects, which meet specifically thermal and/or acoustic requirements.

It is an objective to provide the molded material according to the invention in the form of semi-finished products or components, such that said products or components can be readily introduced into the muffler by the user without technical aids prior to the closing of the muffler; correspondingly, the molded materials in the form of components or semi-finished products must preferably be configured to be flexible. In particular, said components or products, therefore, contain no bonding agents.

On account of a corresponding configuration of the carriers it is furthermore possible to achieve an application-specific shaping of the molded material. Said shaping is further assisted in that a permanent solidification of the wound blank takes place on the carrier. This makes possible a permanent shaping of the wound blank in order to provide correspondingly suitable molded material for, in particular, mufflers.

The solidification, in particular a continuous solidification, is configured to be permanent. The term "permanent" is to be understood here to mean that the solidification lasts at least until the corresponding molded material has been installed and the corresponding housing, such as the muffler, is presented in a closed state. If applicable, an at least partial disintegration of the solidification can take place after installation, in the event that corresponding materials, such as melt threads or cotton threads, having low melting or destruction temperature are used, such that the molded material can completely fill the attenuation chamber inside the housing.

In one embodiment, the solidification, however, is preferably at least partially permanent also during operation in order to ensure the dimensional stability and the stability of the fibers in relation to one another.

The fibrous material is preferably in the form of glass-mineral fibers, carbon fibers, silicate-glass fibers, aramid, natural fibers, in particular cotton, steel fibers or polymer fibers. These fibers may be used on their own or as blends of said fibers.

The molded material produced according to the invention is, in particular, preferably one that contains no bonding agents or adhesives.

The solidification here takes place preferably by known solidification measures, such as by means of air entanglement, stitching, linking, knotting, needling, felting or crocheting. The solidification may also take place, in an alternative embodiment, in such a manner that a thread which has a lower melting point than the fibrous material used for the wound blank is used for the solidification. This makes it possible for the molded material to expand in terms of volume after it has been installed and the muffler has been closed in order, correspondingly, to completely fill the space in the muffler.

According to the invention it is further preferable for the solidification of the wound blank to allow the formation of a molded mat or a molded object, in particular a hollow object.

Preferably, a densification of the wound blank also takes place here.

Particularly preferably, the fibrous material of the wound blank is helically wound, in particular at a pitch of >3%. Appropriate guidance of the guide element for the fibrous material in the production process allows a corresponding formation of the wound blank. In an alternative embodiment, the fibers may be guided substantially parallel. The fibers may be wound in a single layer or, preferably, in multiple layers, it also being possible for the winding to be in opposite directions, as known to a person skilled in the art.

The molded material here may be produced as continuous molded material. Alternatively, the method according to the invention allows the formation of semi-finished products of defined dimensions. In particular it is possible to provide exactly fitting molded materials, such as molded mats or molded objects. The objects produced in this manner here may be rotationally symmetrical or rotationally non-symmetrical parts.

In the event of a continuous molded material being produced, the product may be wound up as roll stock or cut to the desired final contour by a corresponding unit. Cutting can take place here at a predetermined angle or else using some other contour, as is illustrated below.

The method according to the invention, however, is also designed for the production of individual parts.

The molded parts produced according to the invention have a greater volume than existing semi-finished products. Additionally, the degree of voluminization (density of the part) can be influenced by the winding (type of winding, density of winding, etc.) and the subsequent solidification can be influenced on account of production according to the invention by winding on at least two carriers. This positive influencing of the voluminization can be achieved in particular if the fibrous materials used are what is referred to as effect-texturized materials, in which a main thread is texturized in a tensionless manner around a base thread. This allows a reduction in the amount of material, used while preferably at the same time providing a large volume.

The fiber material used here may be a combination of continuous-fiber material and short-fiber material and/or a combination of different fibrous materials and fiber lengths.

Possible fibrous materials may be presented in the form of opened or unopened rovings or as opened or unopened yarns, for example as doubled yarns. The fibers may represent monofilaments. The fibrous materials used may preferably be effect-texturized fibers having a base thread and the texturized main thread. This makes it possible to achieve a significantly higher fiber volume having a recovery characteristic.

The method according to the invention may furthermore comprise a further step of trussing the molded material into a desired shape. Said trussing can be carried out with a variety of materials. Trussing with a melt thread or cotton threads makes it possible to bring the molded material into a desired shape which is undone again during operation, for example in a muffler. Corresponding trussing allows, for example, a simple installation of the molded material in the attenuation chamber. Trussing may also allow a permanent shaping. Here, trussing of the molded material may take place while said molded material is still on the carriers or after the molded material has been removed from the carriers.

A further aspect of the present application concerns a molded material, in particular a molded mat or a molded object, such as in particular a molded hollow object, this being obtainable by the method according to the invention.

The molded materials according to the present invention are in particular those which are suitable for installation in mufflers. A further aspect of the present application correspondingly concerns mufflers equipped with molded material according to the invention, in particular molded mats and molded objects.

Finally, a further aspect of the present application concerns devices for the manufacturing of sound-damping, sound-absorbing and/or insulating molded material from fibrous material. These devices are suitable in particular for the implementation of the method according to the invention. This device comprises at least two carriers which are, if applicable, displaceable. These two carriers are spaced apart from one another and, if applicable, rotatably configured. Here, the carrier itself may be rotatably configured and/or the carriers are rotatable on a device as a group. The device according to the invention furthermore comprises a unit for winding the fiber around the carriers. The device according to the invention here has in particular a guide element (thread feeder or traveler) for guiding the fibrous material, in particular through an eyelet. This guide element allows parallel or cross-laid winding of the fibrous material around the carriers. Finally, the device according to the invention has a unit for solidifying the wound blank. Here, the wound blank is presented in a wound state around the carriers. The unit solidifies the wound blank, while said blank is presented in a wound state around the carriers. In one embodiment, in particular in a device for the manufacturing of continuous molded material, the device furthermore has a unit for cutting the continuous molded material.

The unit for solidifying the wound blank presented on the carriers is preferably one for solidification by means of air entanglement, for stitching, for linking, for knotting or for needling, in particular rotary needling, for felting or for crocheting.

The device is preferably one which has at least three spaced-apart carriers which are, if applicable, displaceable in relation to one another, this unit being rotatably configured with the carriers.

The unit can likewise be implemented with a device which is intended for winding the fiber material and rotates about at least two carriers. These carrier bars, which are configured with guide rollers or are helically shaped, allow the continuous molded material to be transported further to further processing steps, such as the additional solidification or for winding up into roll stock.

In the following, the invention will be described and explained further by means of the preferred exemplary embodiments illustrated in the figures.

Figure 1B:
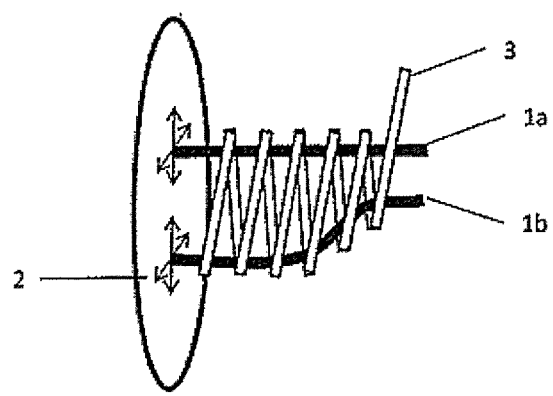
Figure 1C:
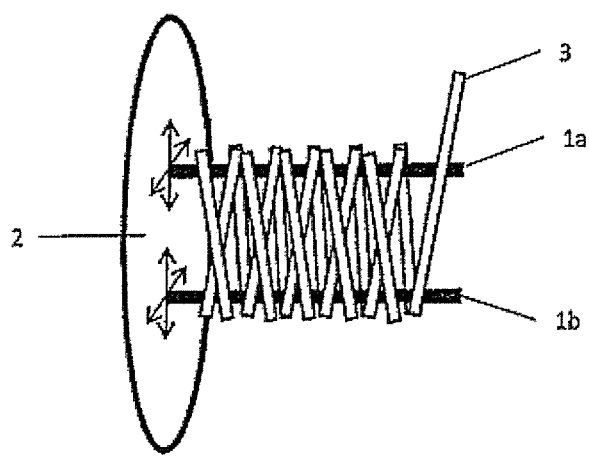

Figures 1a-1c illustrate various possibilities of winding the fibrous material on the carriers. The carriers 1a, 1b are displaceably arranged here. The carriers themselves, which are configured as bars here, may be rotatable as individual bars, or the device 2 having the bars may be rotatably configured. In the embodiment according to FIG. 1a, the bars are configured substantially parallel to one another, while in the embodiment according to Figure 1b, the bar 1b is curved, such that the wound blank obtains a corresponding shaping. In the case of continuous windings, the carriers are usually configured substantially parallel. In particular with continuous methods, the carriers may be rotatably configured as individual carriers, in particular as individual bars. For example, said rotatable bars may have a spiral-shaped surface which allows an advancing movement of the wound blank. In figures 1a and 1b, the wound fiber 3 is wound in a spiral shape around the carriers (winding bodies). Figure 1c illustrates a helical winding having a second helical winding in the opposite direction, on account of which one or more crossings of the fibers 3 occur.

Figure 2A:
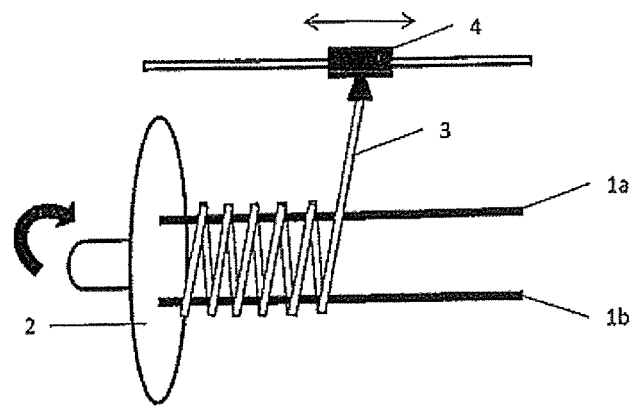
FIGS. 2A-2B show examples of carriers rotatably arranged on a device.

In FIG. 2a, the carriers 1a and 1b are rotatably arranged on the device 2. The fiber 3 is wound onto the rotating carriers in a helical manner by the displaceable traveler or fiber feeder 4 in order to form the wound blank. The traveler 4 here is movably arranged on a moving element in order to allow the various shapes of winding for the wound blank. The winding here may take place helically, for example at a pitch of >3%, or substantially parallel. The winding may be formed in one or more layers, it also being possible for the winding in a multilayer formation to represent helical windings in opposite directions, as also illustrated in FIG. 1C.

Figure 2B:
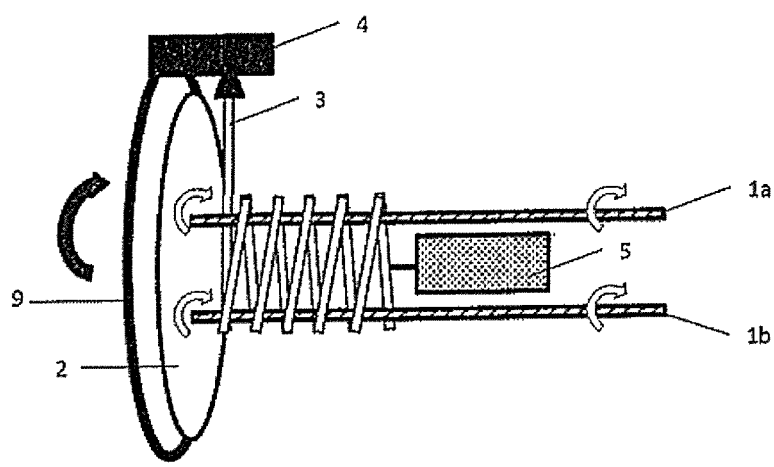

The embodiment according to FIG. 2b illustrates a similar unit. Here, the thread feeder 4 is arranged on a disc 29 which rotates about the device 2. The carriers 1a, 1b in this case remain rigid on the device 2. Furthermore, the carriers 1a and 1b may be configured as rotatable individual bars. In this case, they have a spiral-shaped surface which enables an advancing movement of the wound blank. Also illustrated is the unit 5 for solidifying the wound blank. The unit enables the permanent solidification of the wound blank presented on the carriers 1a, 1b, for example by air entanglement, stitching, linking, knotting, needling, felting, or crocheting.

Figure 3A:
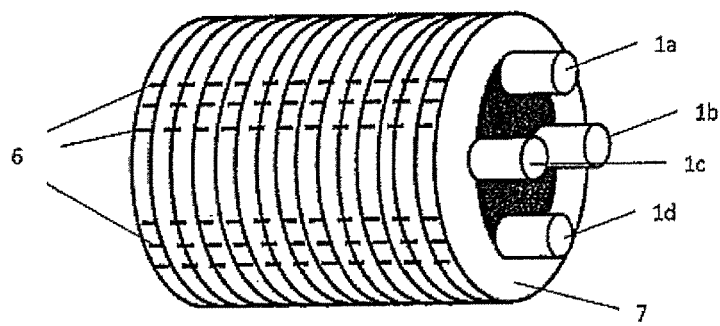
FIGS. 3A-3D show a variety of molded materials.

FIGS. 3A-3D illustrate a variety of molded materials. FIG. 3a shows a hollow object which is presented on four carriers 1a, 1b, 1c, 1d. The solidification regions 6 of the solidified molded material 7 are also indicated.

Figure 3B:
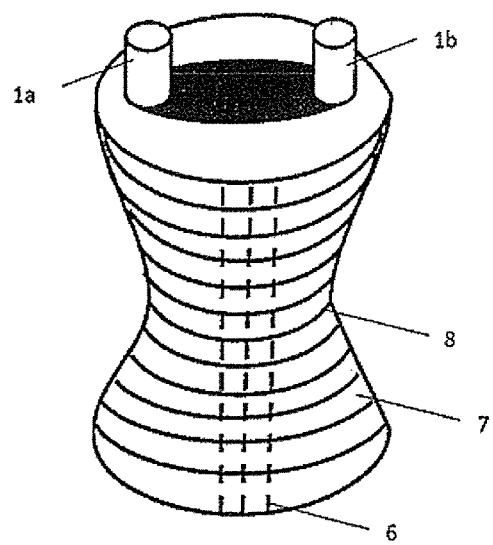
Figure 3C:
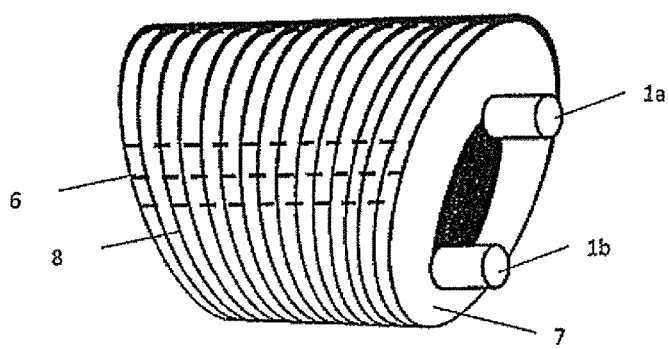
Figure 3D:
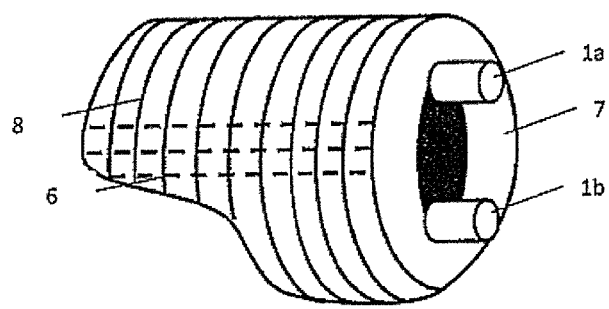

By corresponding trussing, the solidified fibrous material can then be made into desired shapes. This is illustrated in FIGS. 3c and 3d. Corresponding trussings 8 allow the molded material to be formed into the desired structure. FIG. 3b illustrates a molded object 7 according to the invention which has been wound on two curved carriers 1a and 1b. This molded object has been further solidified in the region 6. As illustrated in the figure, the solidification of the wound blank can thus take place only on one side of the winding. Alternatively, a solidification of both winding sides may also take place, such that a flattened and densified fibrous mat is obtained. Such an embodiment is illustrated in FIG. 4b. FIG. 4b shows the individual method steps. In step 1, the fiber 3 is wound around the two carriers 1a and 1b. In the second step, this wound blank is further solidified in order to obtain a solidified molded material, in this case in the form of a fiber mat. As illustrated, both sides of the winding have been solidified with one another here, in order to obtain a flattened and solidified mat. The lower illustration shows said fiber mat from another perspective. The bars 1a and 1b, the molded material 7 having the fibers 3, and the solidified regions 6 are identifiable.

Figure 4A:
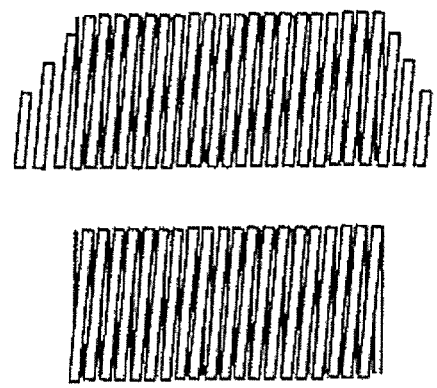
FIG. 4A shows various types of trimming for a molded material.
Figure 4B:
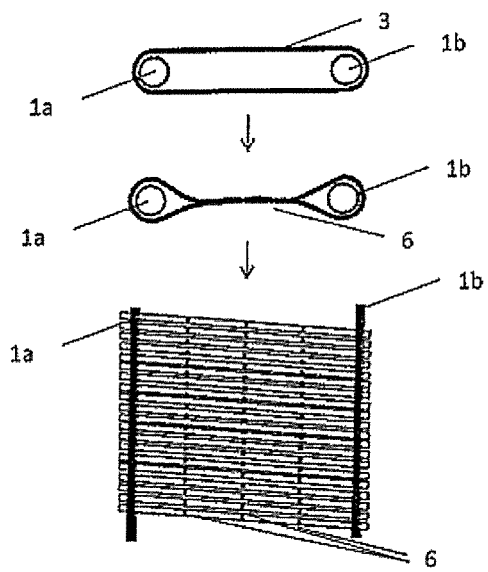
FIG. 4B schematically shows the formation by solidification of both winding sides to obtain a flattened and densified fibrous mat.

The various types of trimming for the molded material obtained are illustrated in FIG. 4a. The upper illustration shows a trimming executed in a right-angled manner at both ends; the center illustration shows a contour which has been executed in an oblique manner at both ends.

Figure 4C:
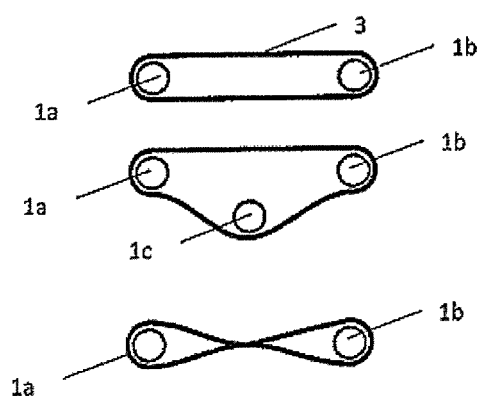
FIG. 4C shows different examples of winding with two or three carriers.

FIG. 4c shows the various possibilities of winding with two or three carriers, in order to obtain the wound blank. The upper illustration illustrates single winding around the two bars 1a and 1b. The center illustration shows winding using three bars 1a, 1b, 1c. The lower illustration shows a further preferred embodiment in which the fiber 3 is guided so as to cross over between the bars. This embodiment allows the molded material obtained to solidify without additional measures.

The invention claimed is:

1. A method for producing sound-damping, sound-absorbing or insulating molded material, said molded material comprising fiber material, wherein said method has the following steps:
   a) winding the fibrous material around at least two carriers which are spaced apart from one another, for producing a wound blank,
   b) permanently solidifying the wound blank which is presented on the carriers, for the formation of the sound-damping, sound-absorbing or insulating molded material, wherein the permanent solidification of the wound blank for the formation of the molded material on the carriers takes place by means of air entanglement, stitching, linking, knotting, needling, felting or crocheting, and wherein the fibrous material is in the form of glass-mineral fibers, carbon fibers, or silicate-glass fibers, or blends thereof.

2. The method as claimed in claim 1, wherein winding takes place around at least three or more carriers which are, if applicable displaceably, spaced apart from one another, for the formation of a molded object, in particular a hollow object.

3. The method as claimed in claim 1, wherein the solidification comprises a densification of the wound blank, for producing a molded material in the form of a mat or an object.

4. The method as claimed in claim 1, wherein the fibrous materials are helically wound.

5. The method as claimed in claim 1, wherein a continuous molded material is produced.

6. The method as claimed in claim 1, wherein the molded material obtained, in a further step, is deformed into a required shape by trussing.

7. The method as claimed in claim 1, wherein the fibrous material comprises a combination of continuous-fiber material and short-fiber material and/or a combination of different fibrous materials and fiber lengths, and/or the fibrous material is used in the form of rovings and/or yarns and/or doubled yarns and/or effect-texturized fibers and/or monofilaments.

8. A molded material obtainable by a method as claimed in one of claims 1 or 2 to 7.

9. A muffler comprising molded material as claimed in claim 8.

10. A device for the manufacturing of solidified sound-damping, sound-absorbing and/or insulating molded material having at least two, if applicable displaceable, carriers which are spaced apart from one another, said carriers being rotatably arranged, if applicable as individual carriers or as a group of carriers, having a unit for winding a fiber material around the at least two carriers and having a unit for solidifying the wound blank which is produced from the fibrous material and presented on the carriers wherein the unit for solidifying the wound blank presented on the carriers is one for solidification by means of air entanglement, for stitching, linking, knotting or needling, in particular rotary needling, felting or crocheting.

11. The device as claimed in claim 10, wherein the unit having the carriers is one having at least three spaced-apart carriers which are, if applicable, displaceable in relation to one another, and this unit, as a group, and/or the individual carriers is/are, if applicable, rotatably configured.

12. The device as claimed in claim 10, wherein said device is configured for producing a continuous fibrous material and furthermore has a unit for cutting the molded material to a predetermined length.

13. The method as claimed in claim 1 wherein solidification takes place without bonding agents.

14. The method as claimed in claim 1 wherein the at least two carriers are displaceably spaced apart from one another.

15. The method as recited in claim 3 wherein said object is a hollow object.

16. The method as recited in claim 4 wherein the fibrous material is helically wound at a pitch of >3%.

17. The molded material as claimed in claim 8, wherein said molded material is in a form of a molded mat or a molded object.

18. The muffler as claimed in claim 9 wherein said molded material is in a form of a molded mat or a molded object.

* * * * *